United States Patent [19]

Williams

[11] Patent Number: 4,464,576

[45] Date of Patent: * Aug. 7, 1984

[54] ENGINE STARTER DRIVE

[75] Inventor: James O. Williams, Horseheads, N.Y.

[73] Assignee: Facet Enterprises, Inc., Tulsa, Okla.

[ * ] Notice: The portion of the term of this patent subsequent to Dec. 28, 1999 has been disclaimed.

[21] Appl. No.: 425,587

[22] Filed: Sep. 28, 1982

Related U.S. Application Data

[63] Continuation of Ser. No. 199,410, Oct. 22, 1980, Pat. No. 4,366,385.

[51] Int. Cl.³ ...................... F02N 11/02; F02N 11/00; H02P 9/00; H02K 1/06

[52] U.S. Cl. .................................... 290/38 R; 74/7 R; 74/7 C; 74/6; 123/179 M; 290/38 A; 290/38 C

[58] Field of Search ................ 290/38 C, 38 R, 38 A, 290/48, DIG. 1, DIG. 11; 91/53; 74/7 R, 6, 7 C; 123/179 M

[56] References Cited

U.S. PATENT DOCUMENTS

| | | | |
|---|---|---|---|
| 2,727,158 | 12/1955 | Seilly | 290/38 R |
| 3,084,561 | 4/1963 | Mattson | 290/38 R |
| 3,124,694 | 3/1964 | Seilly | 290/38 A |
| 3,177,368 | 4/1965 | Seilly | 290/48 X |
| 3,465,353 | 9/1969 | Buxton et al. | 123/179 M |
| 3,572,133 | 3/1971 | Giometti | 290/38 X |
| 3,686,961 | 8/1972 | Campbell | 74/7 R |
| 3,791,685 | 2/1974 | Hamman | 290/48 X |
| 3,922,558 | 11/1975 | Hollyoak | 290/38 A |
| 4,156,817 | 5/1979 | Preece et al. | 290/38 R |
| 4,366,385 | 12/1982 | Williams | 290/38 R |

*Primary Examiner*—J. V. Truhe
*Assistant Examiner*—Terry Flower
*Attorney, Agent, or Firm*—Remy J. VanOphem

[57] ABSTRACT

A starter drive for internal combustion engines. The starter drive is mounted within the starter housing and connected to the motor driven shaft. The shaft has a screw thread formed thereon near the armature of the starter and a cylindrical end portion. A screw sleeve member cooperatively engages the screw thread of the motor driven shaft. A ring armature member is centrally mounted to the threaded screw member. A unidirectional clutch member connects the screw sleeve member, the ring armature member and the pinion gear. An engaging member holds the ring armature member to the starter housing when the pinion gear is advanced axially along the motor driven shaft by the rotation of the motor when the motor is activated. Thus, the pinion gear engages the engine ring gear such that the pinion gear is held in mesh with the ring gear and the total motor torque is transmitted to the ring gear until the motor is deactivated.

19 Claims, 9 Drawing Figures

Fig-1
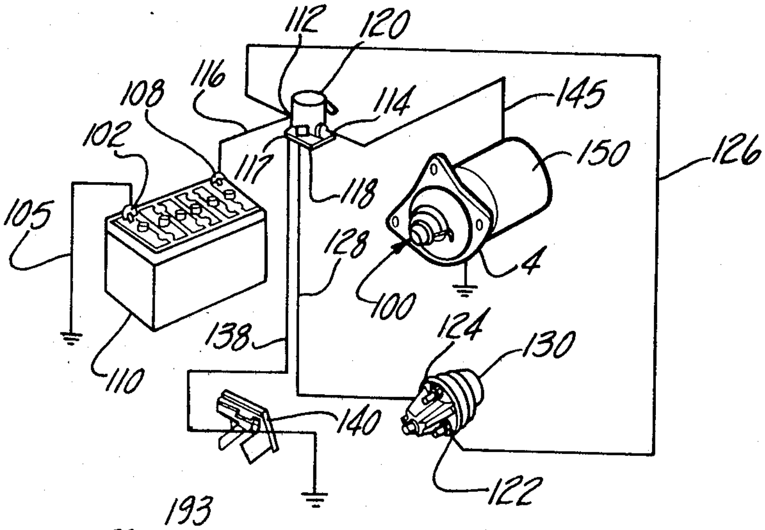
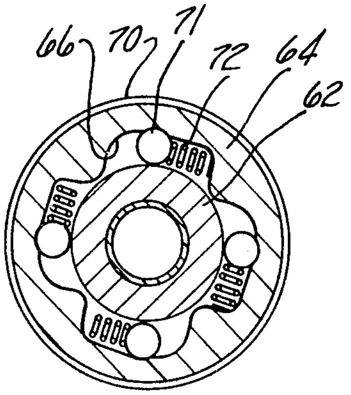
Fig-7
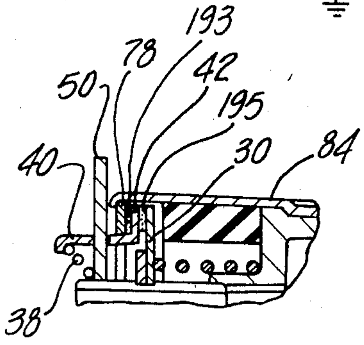
Fig-6
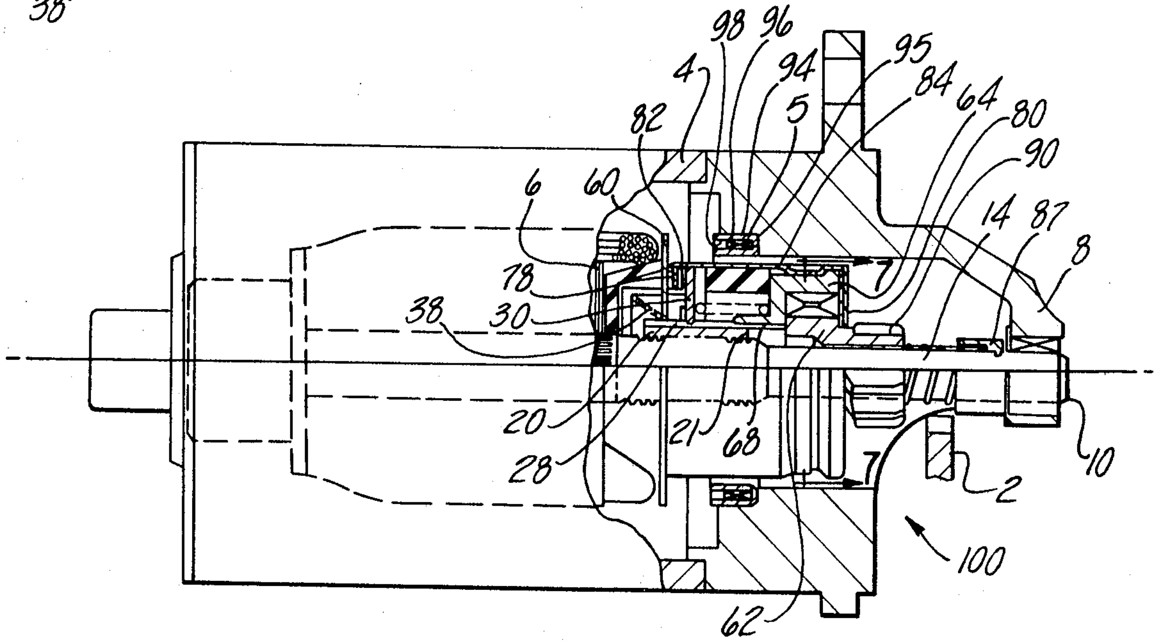
Fig-2

ENGINE STARTER DRIVE

This is a continuation of application Ser. No. 199,410, filed Oct. 22, 1980, now U.S. Pat. No. 4,366,385.

FIELD OF THE INVENTION

The present invention relates to engine starters for internal combustion engines and more particularly to starters of the positive shift type wherein after the starter motor pinion engages the flywheel ring gear of the engine to be started, the coaxial solenoid prevents the pinion gear from demeshing until the starter motor is deenergized.

BACKGROUND OF THE INVENTION

Heretofore, starter motors of the so called piggyback solenoid type, that is, those having a shifting solenoid mounted on the outside of the starter motor housing, have been used extensively in automotive and allied industries for starting internal combustion engines. However, in present industrial and automotive applications, the piggyback solenoid engine starter is not completely satisfactory because of the space that the piggyback solenoid occupies. Also, it is desirable from a production standpoint, to produce a starter housing that is easily adaptable to the various mounting positions required to satisfy a number of engine configurations. By eliminating the piggyback solenoid from the outside of the starter motor housing, the starter motor housing may be mounted in any desirable orientation on the engine without special consideration being given to the shifting solenoid or related parts. In addition, the starter motor can be manufactured to satisfy the various mounting requirements for various types of internal combustion engines, thereby limiting the need of manufacturing several types of starter motor housings.

DESCRIPTION OF THE PRIOR ART

Coaxial solenoid type starter motors which eliminate the need for piggyback solenoids are not new, and have been known in the prior art. For example, Mattson, U.S. Pat. No. 3,084,561 uses a movable solenoid and helical splines to move the pinion and overrunning clutch prior to closing the motor power switch to rotate the armature. Giometti, U.S. Pat. No. 3,572,133 has a friction connection between the shiftable drive portion and the starter drive housing for assisting the advance of the shiftable drive portion into engagement with the ring gear. An electromagnetic brake is also provided in order to prevent drive rotation and to facilitate drive advance into engagement with the ring gear. As the pinion drive engages the ring gear, the brake is deenergized. Seilly, in U.S. Pat. No. 2,727,158 uses a solenoid to move the shiftable drive portion axially to initially engage the engine ring gear. As this occurs, a switch closes the contact to pass current through the motor to rotate the starter shaft. This causes shiftable the drive portion to further slide axially into full engagement with the ring gear. A catch ball arrangement is provided to secure the shiftable drive portion to the sleeve which then deenergizes the solenoid. In U.S. Pat. No. 3,124,694, Seilly provides an axially movable core to impart initial axial movement to the shiftable drive portion. Hollyoak, in U.S. Pat. No. 3,922,558 provides an electromagnetic arrangement for moving the pinion assembly from its rest position to its operative position. In the drive connection, between the electromagnetic arrangement and the pinion assembly, there is a member which bears against one end of the pinion assembly. This member, in the rest position of the pinion assembly, is trapped between the pinion assembly and a collar carried by the shaft. When the electromagnet is energized, it moves the armature in such a manner that the pinion assembly is urged by way of the member towards its operative position. The shaft and the pinion assembly rotate relative to the armature and the member when the electric motor is energized. However, the armature and the member act as a brake to inhibit rotation of the pinion assembly and the shaft, when the pinion assembly returns to its rest position. In the rest position, the member is trapped between the pinion assembly and the collar carried by the shaft. Finally, Nardone, in U.S. Pat. No. 1,939,405 and Celio in U.S. Pat. No. 2,333,765 use an electromagnet to cause axial movement of the drive portion into mesh with the flywheel prior to causing the rotation of the starter motor shaft.

None of the above identified prior art starter motors have proven entirely satisfactorily for present day use for various reasons. Either they were unreliable in service over an extended period of time or they were too expensive to manufacture. Many other problems were also presented in the production of coaxial types of starters such as the provision of suitable electrical characteristics of the solenoid and accompanying parts, the provision of a suitable on/off switching for the electric starter motor and the reduction of overall manufacturing costs, all of which heretofore have not been completely satisfactorily solved. In addition, all of the above identified prior art designs utilize an electromagnetic coil with relatively large current draw to facilitate drive advance to engage with the ring gear.

SUMMARY OF THE INVENTION

The present invention is directed to a starter drive which advances the drive pinion on helical splines without rotation, by inertia, to engage the engine ring gear. The drive pinion is held in engagement with the engine ring gear by an engaging mechanism which allows total motor torque to be transmitted to the ring gear until the motor is deactivated.

The present invention provides a starter drive for internal combustion engines having a starter drive housing, a motor driven shaft having a cylindrical end portion and a helical threaded portion between the cylindrical end portion and the motor. The starter drive includes a screw sleeve mechanism for cooperatively engaging the helical threaded portion on the motor driven shaft. A ring armature member is centrally disposed relative to the screw sleeve mechanism and connected to the screw sleeve mechanism. Furthermore, a drive pinion is coaxially disposed on the cylindrical end portion of the motor driven shaft. In addition, a unidirectional clutch mechanism interconnects the screw sleeve mechanism and the drive pinion. Finally, the ring armature mechanism is engaged to the starter drive housing when the drive pinion is advanced along the motor driven shaft by the rotation of the motor when the motor is activated so as to engage the engine ring gear. Thus, the drive pinion is held in engagement with the engine ring gear and the total motor torque is transmitted to the ring gear until the motor is deactivated.

It is, therefore, a primary object of this invention to provide an engaging mechanism which secures the ring armature mechanism to the starter drive housing when the drive pinion is advanced along the motor driven shaft by the rotation of the motor when the motor is activated so as to engage the engine ring gear such that the drive pinion is held in full engagement with the engine ring gear by the engaging mechanism.

It is another object of the present invention to provide an engaging mechanism to hold the ring armature mechanism to the starter drive housing when the drive pinion is advanced along the motor driven shaft by the rotation of the motor when the motor is activated so as to engage the engine ring gear such that the total motor torque is transmitted to the engine ring gear until the motor is deactivated.

It is yet still another object of the present invention to provide an engaging mechanism which holds the ring armature mechanism to the starter drive housing after the drive pinion has advanced along the motor driven shaft by the rotation of the motor when the motor is activated so as to engage the engine ring gear such that the drive pinion is held in engagement with the engine ring gear until the engaging mechanism is deactivated. In addition, a unidirectional clutch mechanism interconnects the screw sleeve mechanism and the drive pinion so as to permit overrunning in one direction of rotation of the motor shaft.

Other objects and advantages of the invention will become apparent upon reading the following detailed description on reference to the drawings.

BRIEF DESCRIPTION OF THE DRAWINGS

FIG. 1 is a schematic view of an electrical starting circuit for a starter according to my invention;

FIG. 2 is a side view of the preferred embodiment of the starter drive according to my invention, partially in section, in the energized position;

FIG. 6 is a side view of an alternate embodiment of a starter drive according to my invention, partially in section, in the energized position;

FIG. 7 is a sectional view along 7—7 in FIG. 2;

DETAILED DESCRIPTION OF THE PREFERRED EMBODIMENTS

Figure 3:
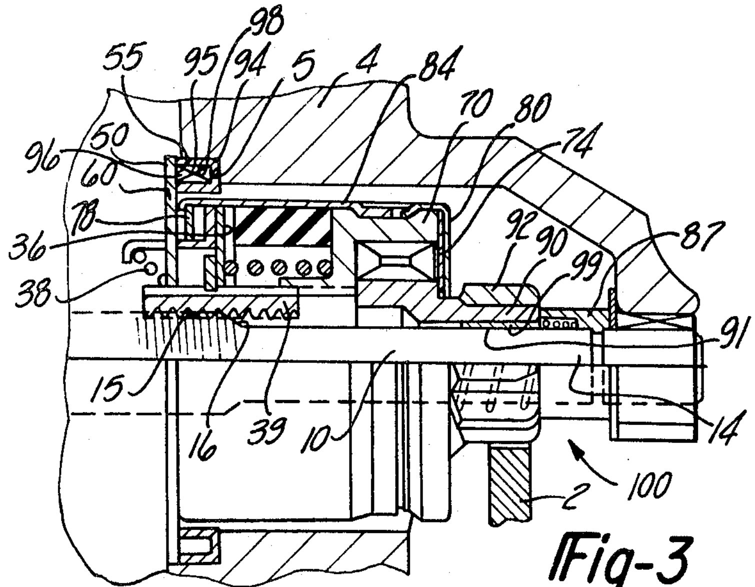
FIG. 3 is a side view of the preferred embodiment of the starter drive according to my invention, partially in section, with the pinion gear fully engaged to the ring gear.

Referring to FIG. 1, the invention is shown in connection with a starting circuit for a conventional automobile engine. A battery 110 is connected at a first terminal post 102 by a cable 105 to ground. A relay 120 is connected at one end 112 by a cable 116 to a second terminal post 108 of the battery. A starter switch 130 is connected at one terminal post 122 by a cable 126 to the one end 112 of the relay. The other terminal post 124 of the starter switch is connected to a third end 118 of the relay 120 by means of a cable 128. A transmission neutral switch 140 is connected at one end to the ground and at the other end to a fourth end 117 in the starter relay by means of a cable 138. A second end 114 of the relay 120 is connected by means of a cable 145 to a starter motor 150. The starter motor 150 incorporates a starter drive generally designated as 100 according to my invention, as will be more fully described herein. Finally, the starting circuit is completed by connecting the starter motor housing 4 to ground.

As is shown in FIGS. 2 through 5, the starter drive 100 is mounted on a drive shaft 10 which is rotatably mounted in the starter motor housing 4 and which extends from an electric motor armature 6 to a motor housing nose 8. The drive shaft 10 further has a diametral or first cylindrical portion 14 adjacent one end 12. The drive shaft 10 also has axial advancing means 15 including for example, helical splines 16 formed on a second cylindrical portion 18 which extends between the first cylindrical portion 14 and the electric motor armature 6 as is shown in FIGS. 2 through 5.

The starter drive 100 includes screw sleeve means 39, ring armature means 60, a drive pinion or pinion gear 90, unidirectional clutch means 80, and engaging means 94. The starter drive 100 engages a ring gear 2 of the internal engine (not shown) to be started.

The screw sleeve means 39 includes an axially extending sleeve member 20 and a first annular ring member 30. The axially extending sleeve member 20 has one end 21 and another end 29. The axially extending sleeve member 20 is connected to the drive shaft 10 by a mutually engageable helical spline connection 26 on its inner diameter. Thus, the axially extending sleeve member 20 is slidably and rotatably advanced along the drive shaft 10 by virtue of the mutually engaging helical splines 16 and 26 when the drive shaft rotates. The axially extending sleeve member 20 also has an outer diameter 24 which has straight splines 28 formed thereon which extend from one end 21 to the other end 29. A circular notch or annular groove 22 is also formed on the outer diameter 24 between the one end 21 and the other end 29. A first annular member 30 is mounted on the straight splines 28 and located adjacent the groove 22 formed on the axially extending sleeve member 20. The first annular ring member 30 also has an outer diameter 34. A first retaining ring 32 is inserted into the annular groove 22 to fix the location of the first annular member 30 on the axially extending sleeve member 20.

Figure 8:
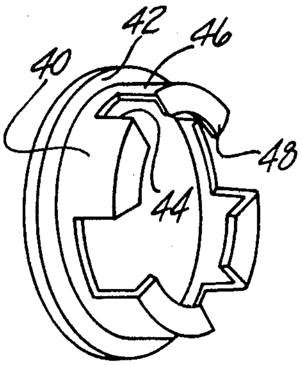
FIG. 8 is a perspective view of the washer member.
Figure 4:
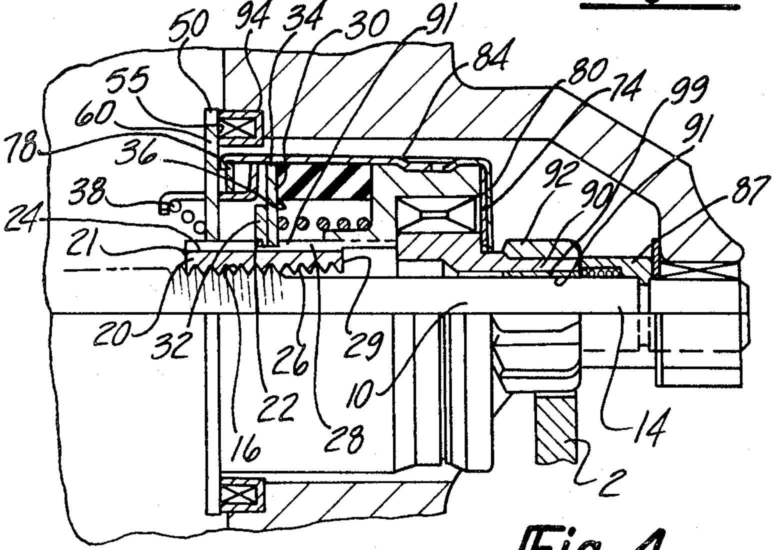
FIG. 4 is a side view of FIG. 2 partially in section, in the cranking position.
Figure 5:
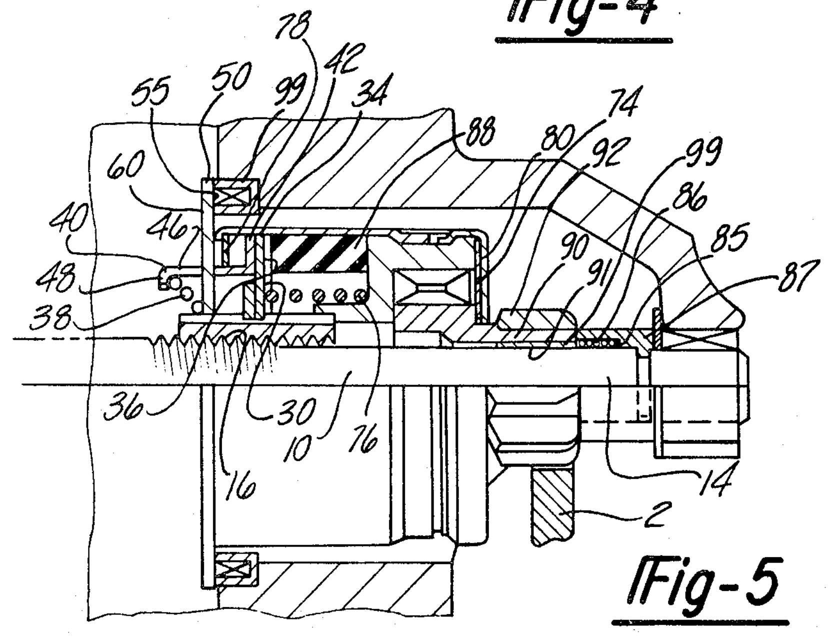
FIG. 5 is a side view of FIG. 2, partially in section, in the overrun condition.

The ring armature means 60 includes a washer member 40 and a second annular member or ring armature 50. The washer member 40 has one end portion 42 which extends radially as shown in FIGS. 5 and 8. The one end portion 42 is mounted proximate to the outer diameter 34 of the first annular member 30. The washer member extends from the one end portion 42 longitudinally along a longitudinal portion 46 to an opposite end portion 48. The opposite end portion 48 also extends radially. The longitudinal portion 46 has a plurality of slots 44 beginning longitudinally a distance from the one end 42 and extending in the direction of the opposite end portion 48 the washer as clearly shown in FIG. 8, for a purpose described later herein.

Figure 9:
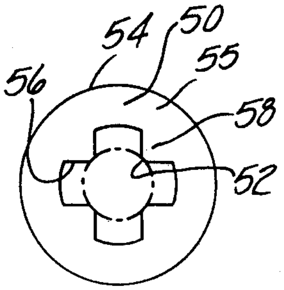
FIG. 9 is a front view of the ring armature member.

As shown in FIG. 9, the second annular member or ring armature 50 has an outer diameter 54, an inner diameter 52, a radial surface 55 with a plurality of arcuate slots 56 partially extending from the inner diameter towards the outer diameter. The ring armature 50 is mounted in the washer member 40 by inserting the longitudinal portions 46 of the washer 40 into the arcuate slots 56 in the ring armature 50. A first biasing member 38 is positioned between the opposite end portion 48 of the washer member 40 and the ring armature 50. The first biasing member 38, for example a helical conical spring member thus biases the ring armature 50 toward the one end portion 42 of the washer member 40.

The pinion drive member or pinion gear 90 has an inner diameter 91 in which a bearing 99 is provided, as shown in FIGS. 2–5. Thus, the pinion drive member 90 is slidably mounted on the first cylindrical portion 14 of the drive shaft 10 with a bearing therebetween. The pinion drive member 90 has a plurality of teeth 92 formed thereon which are adapted for movement into and out of engagement with the engine ring gear 2 of the internal combustion engine (not shown) to be started.

The unidirectional clutch means 80 includes a unidirectional roll clutch 70, a cup-shaped case member 84, a second retaining ring member or abutment member 78, a resilient member 88 and a second biasing member 76. The pinion drive member 90 is connected to the inner race 62 of the unidirectional roll clutch 70. The inner race 62 is mounted to the outer race 64 of the unidirectional roll clutch 70. The outer race 64 is coupled by splines 68 which cooperatively engage the straight splines 28 of the axially extending sleeve member 20 near the other end 29. The outer race 64 has a plurality of cam surfaces 66 formed therein adjacent to the inner race as shown in FIG. 7. A roller spring 72 and on roller 71 are inserted into each of the cavities formed by the cam surfaces 66 between the inner and outer races. Each roller 71 and its respective spring 72 are retained in their respective cavities by a pair of half washers 74 as shown in FIGS. 3 and 7. The rollers, springs and half washers are contained between the inner and outer races by a cup-shaped case member 84. The cup-shaped case member 84 is mounted onto the outer diameter of the outer race 64 and extends radially inward at one end toward the inner race 62. The cup-shaped case member 84 extends from the outer race 64 longitudinally along the axis of the drive shaft 10 toward the electric motor armature 6 and terminates between the second retaining ring 78 and the radial face 55 of the armature 50. A groove 82 is formed in the case member for a purpose to be described herein later. When the drive shaft rotates and torque is transmitted from the drive shaft through the helical splines and straight spline to the outer race 64, the rollers 71 are wedged against the cam surface 66 by the roller springs 72 to prevent relative movement of the outer race 64 to the inner race 62 to transmit torque to the pinion drive 90. When the engine begins to overrun the speed of the drive shaft, the engine ring gear 2 drives the pinion drive 90 faster than the drive shaft 10 is rotating. As this occurs, the inner race 62 urges the rollers 71 against the roller springs 72 and away from the cam surfaces 66. Thus, the pinion drive member 90 and inner race 62 can overrun relative to the other members of the starter drive 100.

The cup-shaped case member 84 confines the first ring annular member 30 as well as the one end portion 42 of the washer member 40 in the cavity, defined by the cup-shaped member, by means of the second retaining ring or abutment member 78 inserted in the groove 82. The first annular member 30 and the one end portion 42 of the washer member 40 are thus free to move axially within the cup-shaped case member 84 towards the drive pinion member 90 but are prevented from moving axially towards the electric motor armature 6 beyond the groove 82 by the abutment member 78 as well as the first retaining ring 32.

A resilient member 88 in the preferred embodiment is a compressible annulus of resilient material such as rubber; however, other materials and configurations are possible in practicing my invention. The resilient member 88 is pendently mounted to the outer race 64 and the first annular ring member 30 so as to be within the cup-shaped case member 84. The second biasing member 76 is preferably a helical spring member which is arranged in the cup-shaped case member 84 so as to extend between the outer race 64 and the first annular ring member 30. Thus, the second biasing member 76 biases the outer race 64 away from the first annular ring member 30 along the mating splines 28, 68 in a direction of maximum extension relative to the axially extending sleeve member 20. The second biasing member 76 thereby provides a gap between the second abutment member 78 and the first annular ring member 30 on the axially extending sleeve 20 as shown in FIGS. 2, 3 and 5. In other words, the spring force of second biasing member 76 is higher than the spring force of first biasing member 38 to provide a gap.

The engaging means 94 includes a fixed or stationary magnet body 95 adapted to be secured in a cavity 5 in the starter motor housing 4. The magnet body 95 is fabricated of magnetic flux conducting material such as iron or steel. The magnet body 95 is formed to provide an annular recess or cavity 98 within which is mounted an electromagnetic coil 96 which may be secured in the cavity by the use of a resin or other well known conventional means. The electromagnetic coil 96 has a set of leads (not shown) which may be connected through an appropriate electrical connector as is well known in the art (not shown). The magnet body 95 is mounted within the starter motor housing 4 such that when the pinion gear 90, unidirectional clutch means 80, ring armature means 60, and screw sleeve means 39 are translated axially along the helical splines, due to inertia, to engage the engine ring gear 2 by the rotation of the drive shaft 10, the radial surface 55 of the second ring armature member 50 which extends radially above the cup-shaped case member 84 is engaged by the magnet body 95 when the electromagnetic coil 96 is energized.

When electrical power is supplied through leads to the electromagnetic coil 96, a magnetic field is generated. This magnetic field is insufficient to pull the starter drive 100 axially along the drive shaft. The electromagnetic coil, by way of nonlimiting example, only draws about a one half amperes of current. This is in contrast to prior art designs with piggyback solenoids which require an order of higher magnitude amperage in order to engage a conventional starter drive with an engine ring gear. When the radial surface 55 of the second ring armature 50 contacts the magnet body 95, the flux path generated by the magnetic field travels in a loop through the magnet body 95 through the second ring armature member 50 and returns back to the magnet body member 95. The magnetic flux thus keeps the second ring armature member 50 in engagement with the magnet body 95 and thus provides a closed contact beween the pole faces of the magnet body and the ring armature. In doing so, the magnet body 95 clamps the radial surface 55 thereby preventing the ring armature member from rotating with the screw sleeve means 39. A stop member 87 is provided adjacent the one end of the drive shaft and is positioned on the first cylindrical portion 14 of the drive shaft to limit the axial travel of the pinion member along the drive shaft toward the motor housing nose 8. The stop member 87 further has a counterbore 85 formed therein to permit placing an antidrift biasing member 86 around the drive shaft and into the counterbore 85. The biasing member 86 extends from the pinion gear to the stop member 87. As the pinion gear moves axially to engage the ring gear, the antidrift biasing member compresses and fits within the counterbore 85 in the stop member 87. When the motor is deenergized, the antidrift biasing member 86 prevents the pinion gear 90 from moving along the drive shaft and contacting the engine ring gear.

OPERATION

When it is desired to start the internal combustion engine, the starter switch 130 is activated to provide electrical connection through the relay means 120 to the electrical motor armature 6 and the electromagnetic coil 96. In some cases, a transmission neutral switch means 140 is connected to the relay means, preventing an electrical connection through the relay means when the transmission neutral switch means is activated until the transmission is in a neutral or park position. When the electrical motor armature 6 is energized, the drive shaft and armature begin to rotate. Because of inertia, the screw sleeve means 39, ring armature means 60, unidirectional clutch means 80 and the pinion drive member 90 do not rotate with the drive shaft. Thus, the screw sleeve means 39 is advanced axially by the screw jack action of helical splines 16 and 26 until the pinion drive member 90 engages the engine ring gear 2.

In the case of abutment of one of the pinion teeth 92 with the engine ring gear 2, the axially extending sleeve member 20 compresses the second biasing member until the first annular ring member 30 abuts against the resilient member 88. Since further axial movement of the axially extending sleeve member 20 toward the engine ring gear 2 is prevented by the abutment, the axially extending sleeve member 20 begins to rotate on the drive shaft by the action of the helical splines 16, 26. This rotation of the axially extending sleeve member is transmitted to the unidirectional clutch means 80 and the pinion gear 90 through the mating straight splined connection 28, 68 on the axially extending sleeve member 20. As the pinion rotates, the abutting tooth clears the obstructing tooth on the ring gear. As the obstructing tooth on the ring gear is cleared, the second biasing member 76 urges the pinion gear and the unidirectional clutch means axially along the straight splines 28, 68 until the teeth 92 on the pinion gear 90 fully engage the engine ring gear 2.

As the pinion gear enages the ring gear, the radial surface surface 55 of the ring armature member is contacted by the magnet body 95. The electrical power supplied through leads to the electromagnetic coil 96 generates a magnetic field whose flux path travels in a loop through the magnet body 95, through the second ring armature member 50 and returns back to the magnet body member 95. The magnetic flux thus exerts an axial pull which provides closed contact between the pole faces, magnet body and the ring armature member which prevents the ring armature member from rotating with the screw sleeve means or to move axially relative to the magnet body while the electromagnetic coil 96 is energized. Simultaneously, the pinion gear is prevented from rotating by the resisting torque of the internal combustion engine. Since the motor drive shaft continues to rotate, the amount of torque being transmitted through the starter drive will begin to rise up to a high peak value. The axially extending sleeve member, on the other hand, begins to axially advance along the helical splines 16, 26 until the surface 36 of the first annular ring member 30 abuts against the resilient member 88. The resilient member is compressed by the axially advancing first annular ring member on the axially extending sleeve member until the resistance to compression of the resilient member is greater than the force required to overcome the resistance of the engine to rotation. Thus, the engine begins to crank. The resilient member also acts to absorb some of the high peak torque which was previously described. Thus, the electric motor metal fatigue normally encountered when metal parts are subjected to high peak torque values is substantially reduced. Once the internal combustion engine begins to crank, the starter drive permits the total developed electric motor torque to be transmitted to the engine ring gear because of the direct mechanical interconnection between the drive shaft 10 and the starter drive 100 of my invention.

Upon ignition of the internal combustion engine, the engine ring gear 2 rotates the pinion gear 90 faster than the rotation of the starter drive. Thus, the pinion gear overruns the starter drive and the screw sleeve means 39 attempts to move axially along the drive shaft on the mutually engaging helical splines 16 and 26 toward the armature means 6 and attempts to demesh from the engine ring gear. As this occurs, the first annular ring member 30 which is rotating and moving toward the electric motor armature 6 applies a frictional force against the one end portion of the washer member 40 which is stationary. This frictional force creates a torque equal and opposite to that developed by the overrunning clutch. Thus, a state of equilibrium is created to keep the pinion gear 90 in mesh with the engine ring gear 2. This frictional force also helps control the motor drive shaft free spin during the overrun condition. This arrangement eliminates the need to provide a shunt coil to limit the free spin of the motor drive shaft as required by many prior art designs. When the starting motor is deenergized, as for example by deactivating the starter switch 130, the electromagnetic coil 96 is also deenergized. Thus, the magnetic body 95 releases its hold on the ring armature member 50 and allows the starter drive to demesh to inertia and the force of the antidrift spring. The antidrift biasing member 86 serves as an antidrift spring to prevent the inadvertent engagement of the pinion gear with the engine ring gear when the motor is deactivated.

In an alternate embodiment of the invention, as is shown in FIG. 6, where like numerals designate like components, a first annular fiber friction member 193 is interposed the abutment member 78 and the one end portion 42 of the washer member 40 within the cup-shaped member 84. Similarly, an annular friction member 195 is inserted between the first annular ring member 30 and the one end portion 42 of the washer member 40. The first and second annular fiber friction member 193, 195 are mounted to the inner diameter of the cup-shaped case member 84 as by conventional adhesive means. The first and second annular friction members 193, 195 help increase the frictional torque level available to oppose the torque developed by the clutch gearing pinion overrun. This also helps reduce the size of the electromagnetic coil required to hold the armature ring member during such periods of overrun as well as it helps to absorb some of the peak torque developed during an engine misfire and clutch overrun conditions. The operation of this alternate embodiment is similar to that of the preferred embodiment except that the first and second annular friction members help to increase the torque level available to resist the torque developed by the overrunning clutch attempting to demesh from the engine ring gear.

While the invention has been described in connection with the preferred embodiments, it will be understood that it will not limit the invention to those embodiments. On the contrary, it is intended to cover all alternatives, modifications and equivalents as may be included in the spirit and scope of the invention as defined by the appended claims.

What is claimed is:

1. A starter drive for an engine having an engine ring gear, said starter drive comprising a housing, a motor, a motor driven shaft, a sleeve axially advanceable on said motor driven shaft upon rotation thereof, housing engagement means connected to said sleeve, a drive pinion mounted on said motor driven shaft, unidirectional clutch means interconnecting said sleeve and said drive pinion, and means for engaging said housing engagement means to said housing as said drive pinion is advanced axially along said motor driven shaft such that said drive pinion is held in mesh with said engine ring gear and such that the total motor torque is transmitted to said engine ring gear until said motor is deactivated.

2. The starter drive of claim 1 wherein said housing engagement means comprises ring armature means centrally disposed relative to said sleeve.

3. The starter drive of claim 1 further comprising helical thread means interposed between said sleeve and said motor driven shaft, said helical thread means advancing said sleeve axially along said motor driven shaft in response to rotation of said motor driven shaft by said motor.

4. The starter drive of claim 1 further comprising indexing means for shifting said unidirectional clutch means and said drive pinion into engagement with said engine ring gear when said drive pinion abuts said engine ring gear and an obstructing tooth on said engine ring gear prevents engagement of said drive pinion with said engine ring gear.

5. The starter drive of claim 1 wherein said means for engaging said housing engagement means to said housing further comprises electromagnetic coil means mounted in said housing at a predetermined axial distance from said engine ring gear.

6. The starter drive of claim 5 further comprising means for frictionally connecting said housing engagement means to said sleeve to limit the free rotational speed of said motor driven shaft.

7. The starter drive of claim 6 further comprising an annular friction member mounted between said sleeve and said ring armature means.

8. An engine starter drive for engaging an engine ring gear to start an engine, said engine starter drive comprising:

a motor;

a motor housing;

a drive shaft extending from said motor, said drive shaft having a first end portion drivingly interconnected with said motor and a second end portion extending from said motor away from said first end portion;

advancing means formed on said drive shaft at a location intermediate said first and second end portions;

a sleeve member mounted on said drive shaft, said sleeve member having one end, an other end opposite said one end, and an intermediate cylindrical portion extending from said one end to said other end, said intermediate cylindrical portion having an inner diameter and an outer diameter, said inner diameter being slidably and rotatably mounted on said advancing means on said drive shaft such that said sleeve member is axially advanced towards said second end portion of said drive shaft upon rotation of said drive shaft;

a pinion gear slidably mounted on said second end portion of said drive shaft for axial movement along said drive shaft, said pinion gear further being adapted for movement into and out of engagement with said engine ring gear to start said engine;

unidirectional clutch means coaxially disposed with said drive shaft and interposed said pinion gear and said sleeve member, said unidirectional clutch means further being slidably mounted on an intermediate portion of said sleeve member between said advancing means and said second end portion;

housing engagement means connected to said sleeve member; and means for interconnecting said motor housing and said housing engagement means when said pinion gear is advanced along said drive shaft by the rotation of said motor when activated so as to contact said engine ring gear such that said pinion gear is held in engagement with said engine ring gear and such that the total motor torque is transmitted to said engine ring gear until said motor is deactivated.

9. The engine starter drive of claim 8 further comprising indexing means for shifting said unidirectional clutch means and said pinion gear into engagement with said engine ring gear when said pinion gear abuts said engine ring gear and an obstructing tooth on said engine ring gear prevents engagement of said pinion gear with said engine ring gear.

10. The engine starter drive of claim 8 wherein said means for engaging said housing engagement means with said motor housing further comprises electromagnetic coil means mounted in said motor housing at a predetermined axial distance from said engine ring gear.

11. The engine starter drive of claim 8 further comprising anti-drift means mounted on said second end portion of said drive shaft for preventing said pinion gear from contacting said engine ring gear when said motor is deactivated.

12. The engine starter drive of claim 8 further comprising a first annular member connected to said outer diameter of said sleeve, said housing engagement means comprising an annular armature ring member coaxially disposed with said first end portion of said drive shaft and interposed between said first annular member and said motor, said annular armature ring member further being connected to said first annular member.

13. The engine starter drive of claim 12 further comprising means mounted between said first annular member and said annular armature ring member for providing a frictional connection therebetween so as to absorb the torque generated by said pinion gear when said pinion gear overruns said drive shaft rotation.

14. The engine starter drive of claim 12 further comprising a resilient member mounted to said unidirectional clutch means, said resilient member further being interposed between said unidirectional clutch means and said first annular member.

15. The engine starter drive of claim 12 wherein said means for interconnecting further comprises electromagnetic coil means mounted in said motor housing at a predetermined axial distance from said engine ring gear.

16. The engine starter drive of claim 14 further comprising biasing means interposed said unidirectional clutch means and said first annular member on said sleeve member, for biasing said sleeve member away from said unidirectional clutch means.

17. The engine starter drive of claim 8 further comprising indexing means for shifting said pinion gear into engagement with said engine ring gear when said pinion gear abuts said engine ring gear and an obstructing tooth on said engine ring gear prevents the engagement of said pinion gear with said engine ring gear.

18. The engine starter drive of claim 17 wherein said housing engagement means further comprises electromagnetic coil means mounted in said motor housing at a predetermined axial distance from said engine ring gear.

19. The engine starter drive of claim 17 further comprising a stop member mounted on said drive shaft adjacent said engine ring gear to limit the axial movement of said pinion gear along said drive shaft.

* * * * *

UNITED STATES PATENT AND TRADEMARK OFFICE
CERTIFICATE OF CORRECTION

PATENT NO. : 4,464,576

DATED : August 7, 1984

INVENTOR(S) : James O. Williams

It is certified that error appears in the above-identified patent and that said Letters Patent is hereby corrected as shown below:

Column 1, line 58, delete "shiftable the" and insert ---- the shiftable ----.

Column 3, line 61, after "switch" insert ---- 130 ----.

Column 3, line 65, after "relay" insert ---- 120 ----.

Column 4, line 15, after "means 39," insert ---- (Fig. 3) ----.

Column 4, line 49, delete "an" and insert ---- the ----.

Column 4, line 54, after "48" insert ---- of ----.

Column 5, line 16, after "70" insert ---- as shown in Fig. 3 and 7 ----.

Column 5, line 18, after "70" insert ---- by rollers 71 ----.

Column 5, line 23, delete "on" and insert ---- the ----.

UNITED STATES PATENT AND TRADEMARK OFFICE
CERTIFICATE OF CORRECTION

PATENT NO. : 4,464,576

DATED : August 7, 1984

INVENTOR(S) : James O. Williams

It is certified that error appears in the above-identified patent and that said Letters Patent is hereby corrected as shown below:

Column 6, line 56, delete "beween" and insert ---- between -----.

Column 7, line 47, delete "surface", first occurrence.

Column 8, line 7, delete "elec-".

Column 8, line 8, delete "tric motor".

Column 8, line 21, after "the" insert ---- electric motor ----.

Column 8, line 40, delete "to", second occurrence, and insert ---- by ----.

Signed and Sealed this

*Ninth* Day of *April 1985*

[SEAL]

*Attest:*

DONALD J. QUIGG

*Attesting Officer* *Acting Commissioner of Patents and Trademarks*